Oct. 20, 1931.  W. H. MUSSEY  1,828,063
SHOCK ABSORBER
Filed Dec. 11, 1929   3 Sheets-Sheet 1

INVENTOR:
WILLIAM H. MUSSEY.
by Oscar Hochberg.
his ATTORNEY.

Oct. 20, 1931. W. H. MUSSEY 1,828,063
SHOCK ABSORBER
Filed Dec. 11, 1929 3 Sheets-Sheet 2

INVENTOR:
WILLIAM H. MUSSEY.
by Oscar Hochberg.
his ATTORNEY.

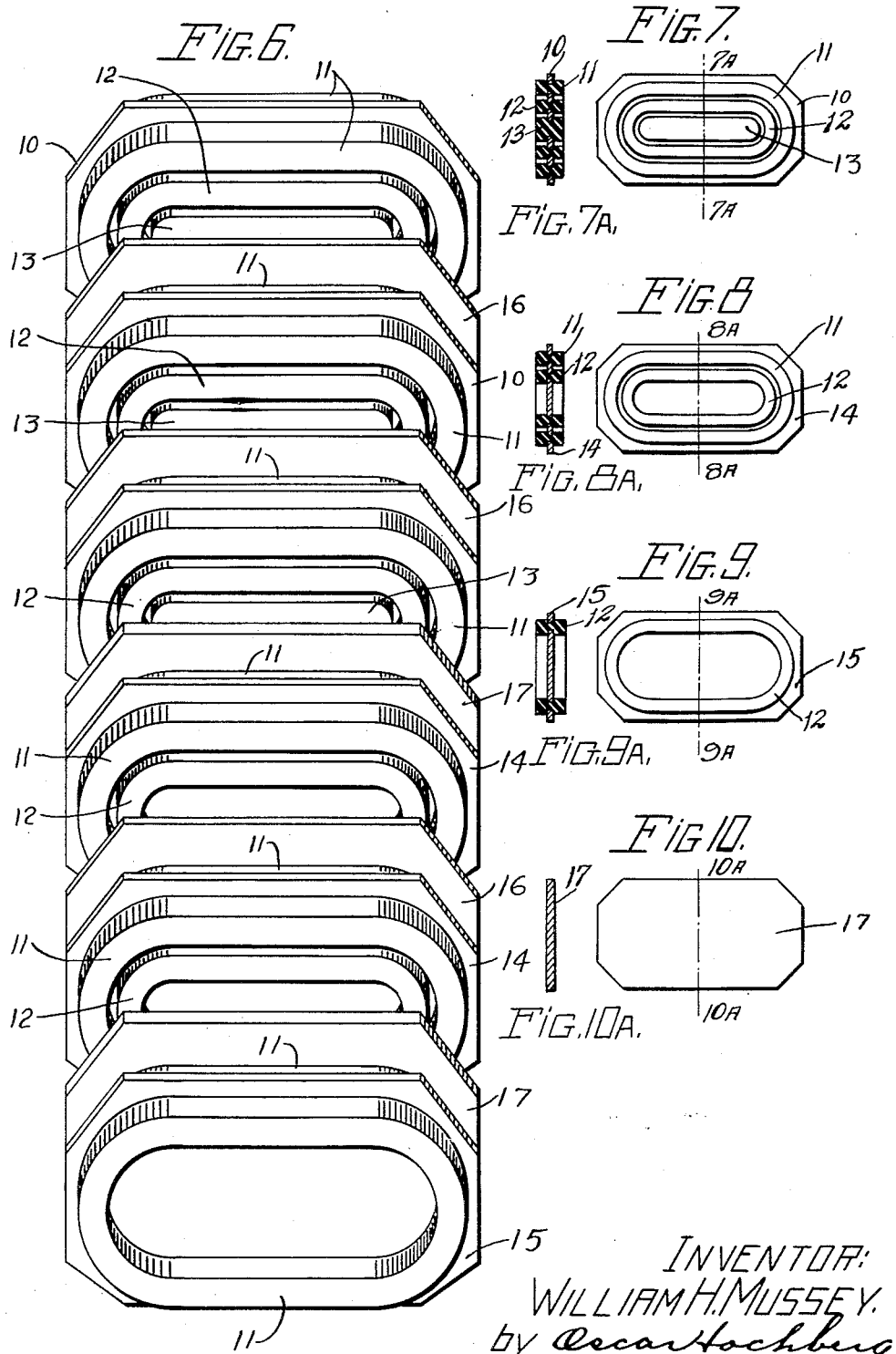

Patented Oct. 20, 1931

1,828,063

UNITED STATES PATENT OFFICE

WILLIAM H. MUSSEY, OF CHICAGO, ILLINOIS, ASSIGNOR TO PULLMAN CAR AND MANUFACTURING CORPORATION, OF CHICAGO, ILLINOIS, A CORPORATION OF ILLINOIS

SHOCK ABSORBER

Application filed December 11, 1929. Serial No. 413,292.

The invention relates to draft and buffing devices in which the resistance elements employed are rubber spring units used either in combination with flat metal volute springs arranged in operating series therewith, or independently of such springs, and primarily designed for service in railway freight and passenger train equipment.

The invention further contemplates the use in the series of rubber springs of units having relatively different capacities and arranged to collectively transmit and progressively absorb the shocks of impact and vibrations resulting from the surging or lagging movements of cars coupled in a train.

A further and important object is to so correlate and proportion the operating elements of the draft and buffing devices built in accordance with the invention that the parts may be applied to new or existing equipment with equal facility and rendered accessible for inspection or repairs.

The foregoing and other objects are attained by the mechanism illustrated in the accompanying drawings, in which Fig. 1 is a plan, partially in horizontal section showing a buffing device fitted to a car and with its parts arranged in accordance with the invention;

Fig. 6 is an isometric view of the rubber spring units and separator plates comprising the spring groups depicted in preceding figures when units of relatively different capacities are employed;

Figure 11:
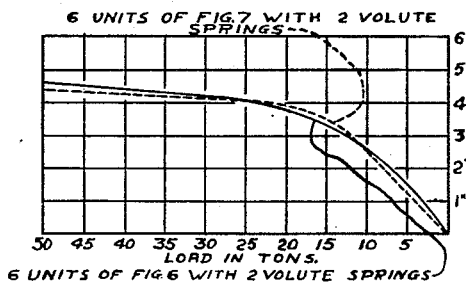
Figure 12:
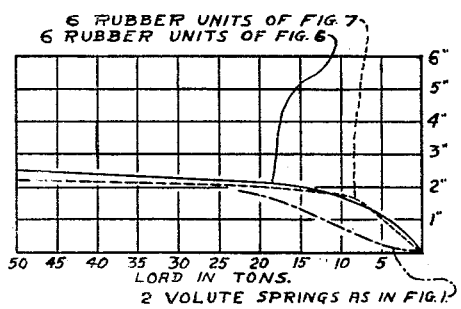

Figs. 7, 8, and 9, show respectively the three, two, and single element units successively arranged in the spring groups of the preferred embodiment of the invention;

Fig. 10 shows one of the distributor plates interposed between the several springs of a group and thickened for use between units of relatively different capacities;

Fig. 11 is a chart graphically illustrating the behavior of the rubber springs proportioned as shown in Figs. 1, 2, 3, and 6, and the characteristics of such group when combined with flat metal volute springs shown in the first three figures; and Fig. 12 is a similar graph of the characteristics of a group of rubber spring units having like individual capacities and also showing the action of two flat volute springs of the kind indicated in the figures.

In the practice of the invention it is proposed to use rubber spring units of relatively different resistance properties arranged in series to collectively transmit and successively absorb the stresses imposed. For this purpose the group of rubber springs is made up of units comprising metal base plates 10 having concentric outer and inner elliptic rings 11 and 12 of rubber moulded into perforations in the plates and protruding from opposite faces thereof, and a central elongated rib 13 of rubber similarly mounted and paralleling the major axes of the concentric elliptic rings as best shown in Fig. 7; base plates 14 with only the rubber concentric outer and inner rings 11 and 12 shown in Fig. 8; and plates 15 as shown in Fig. 9 with but a single rubber ring element 11 mounted thereon.

As indicated in Figs. 1, 2, 3, and 6, the several units are separated by plates 16, dividing units of like capacity, and by heavier distributor plates 17 between units of relatively different capacities. Thus arranged, the outer rings 11 of the several units abut against opposite sides of all the separator plates in the same peripheral plane to function as a tubular column extending between followers 18 and 19 shown in Figs. 1 and 2. The inner rings 12 however, provide a similar but relatively shorter column extending between rear follower 18 and the heavy distributor plate 17 farthest removed therefrom and against which the column abuts at one of its ends. A third and relatively shorter column, built up of the centrally positioned ribs 13, and extending only between the rear follower 18 and nearest distributor plate 17, provides the third element of resistance. As shown in the figures, contiguous rubber spring units of relatively different capacities are separated by intervening distributor plates 17 of substantial rigidity to transfer the excess loads upon the outer elements 11 of the several units to the inner elements 12, thence to the central column made up of the elongated elements 13 of the group, as a result of which a graduated resistance to impact is progressively developed.

The rubber spring group may be used alone in cars of relatively light capacity such as caboose cars and certain cars in freight service where ultimate shocks possible are not as severe as in relatively heavy passenger train movement. When thus employed a group of rubber units having relatively different capacities and arranged to successively absorb the work such as that indicated in Figs. 1, 2, 3, and 6, provides for the initial movement necessary to effect the coupling of the cars so equipped and with ample reserve capacity to resist service shocks.

Figure 4:
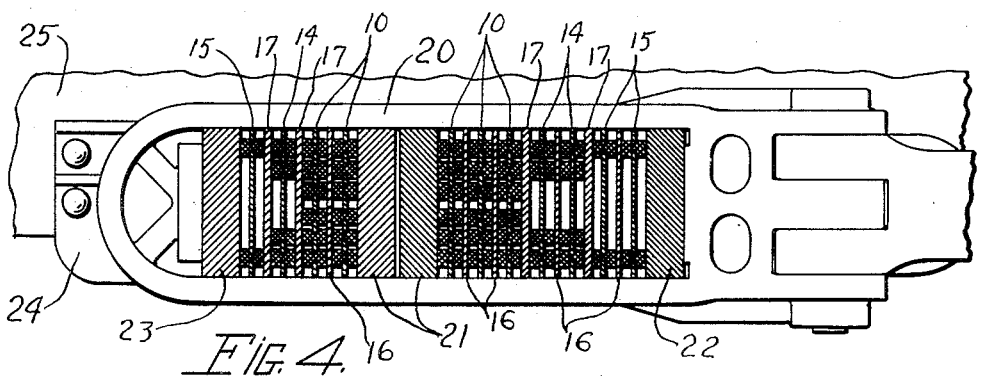
Fig. 4 is a similar view showing the application of the invention to a draft gear in which groups in tandem of rubber spring units of relatively different capacities are employed.
Figure 5:
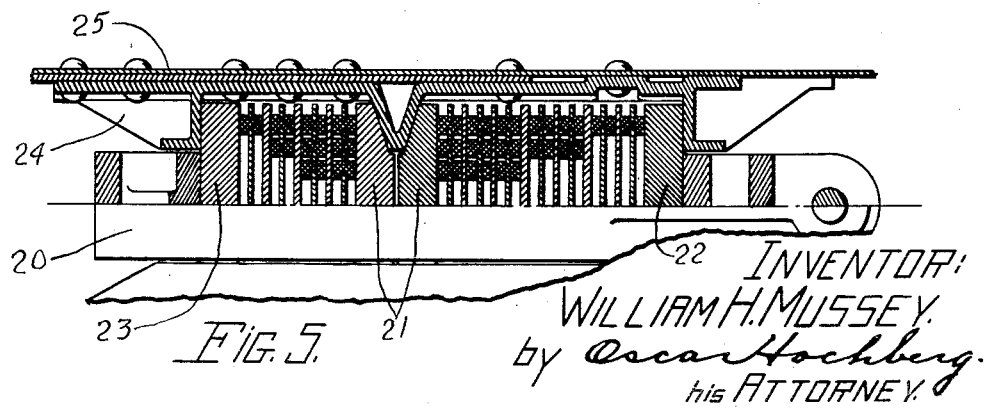
Fig. 5 is a plan view partially in section of the gear illustrated in Fig. 4.

The number of groups of rubber units of the proportions indicated may be increased for use in draft gears of the type used with buffing apparatus and illustrated in Figs. 4 and 5, wherein is depicted the usual draft yoke 20 supported upon relatively fixed intermediate followers 21, and movable front and rear followers 22 and 23, respectively, supported in draft lugs 24 secured to longitudinal sills 25 of the car. A group of seven rubber units is employed in buffing and an independently operable rear group of four of such units functions in draft operations. In proper cases the groups in the yoke may be arranged to function simultaneously where heavier service loads are to be encountered.

The seven unit group comprises three of the triple element units 10, as shown in Fig. 7, and two each of the two element unit 14 and single element unit 15, as shown in Figs. 8 and 9, respectively, while the rear group of four units is made up of two triple element units 10, and one each of the two and single element units 14 and 15. Within the elastic limit of the rubber units proportioned and assembled as shown in the figures the stresses imposed are stored up to progressively resist coupler movement without shock and to positively restore the parts to their normal condition when cars are at rest.

Figure 1:
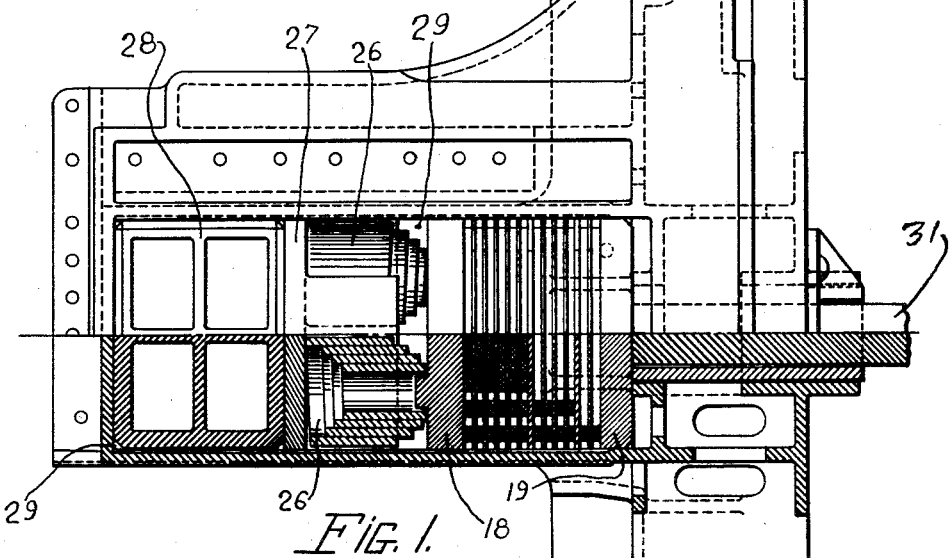
Figure 2:
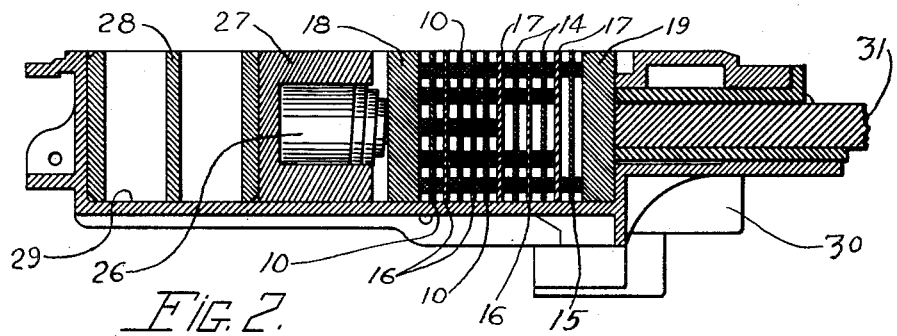
Fig. 2 is a longitudinal vertical section showing the relation of the springs and associated parts.
Figure 3:
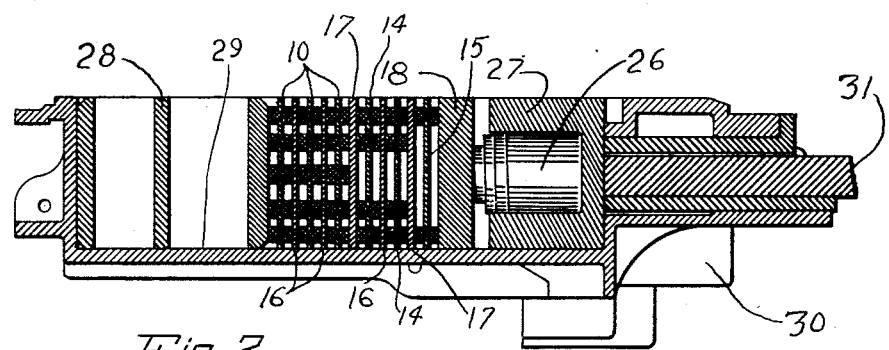
Fig. 3 is a similar view showing a modified embodiment of the invention in which the group of rubber spring units is positioned at the rear of the metal volute springs.

As shown in Figs. 1, 2, and 3, the rubber springs may be supplemented by flat metal volute springs 26 arranged in series therewith for the purpose of providing a more uniform spring action to cushion the initial stresses imposed during coupling operations when used for buffing only. The springs 26 are assembled behind rear follower 18 and arranged in twin formation in the embodiment shown in Fig. 1 and held in operative relation in casing 27 assembled with filler block 28 and the other elements of the buffing mechanism in pocket 29 of the buffer end sill casting 30.

When the springs 26 are placed in front of the rubber spring group as in Fig. 3, the front follower 19 is eliminated and its function performed by spring casing 27 which now becomes movable within the pocket 29 under pressure from center buffer stem 31 thru movement of the diaphragm face plates (not shown). As shown, the filler block 28 provides the necessary abutment for the three rubber columns formed by the elements 11, 12, and 13 of the several units 10, 14, and 15 of the rubber spring group.

In both embodiments, the springs 26 are initially compressed to capacity before the coupling operation can be completed, the consummation of which is effected only upon initial compression of the longest of the rubber column formed by the outer rings 11 of the several units 10, 14, and 15, and the further and continued compression of the inner and central columns made up respectively of the rings 12 and elongated bars 13 of the units. In practice, the buffer parts are proportioned to move in unison with the draft gear upon consummation of coupling movement until the maximum working compression of the springs in both has been effected.

The value of the use of flat metal volute springs 26 in combination with a group of rubber spring units of like or varying capacities is graphically demonstrated by the chart of Fig. 11, when compared with the behavior of the spring and rubber groups independently of each other as graphically outlined in the chart of Fig. 12. The tests indicated initial travel of the combined springs to have been more nearly proportionate to the load imposed than that obtainable from the use of the springs separately, although a substantial improvement was discernible in the ratio of travel to load by the group of rubber units of varying capacities as shown in Figs. 1, 2, 3, and 6, the relative values being indicated in chart of Fig. 12.

From the foregoing it will be noted that there has been provided a shock-absorber adapted as a draft gear or buffing mechanism comprised entirely or in greater part of rubber spring units so assembled with respect to each other and/or metal volute springs, when metal springs are used, that a progressively increased resistance will be developed to neutralize shocks of impact and transmit them to the car underframe. The several units are removably and interchangeably supported to facilitate installation or replacements and to lend flexibility to the system, as will be evident.

What I claim is:—

1. In a shock-absorber, the combination comprising rubber spring units of the character described, metal springs serially arranged therewith, a relatively thick follower plate between said rubber and metal springs, and metal division plates of less thickness separating the several rubber spring units.

2. In a shock-absorber, the combination comprising rubber spring units of the character described, flat metal volute springs serially arranged therewith, a relatively thick follower plate between said rubber and metal springs, and metal division plates of less thickness separating the several rubber spring units.

3. In a shock-absorber, the combination comprising rubber spring units of the character described and having relatively different resistance values, a pair of flat metal volute springs serially arranged therewith, a relatively thick follower plate between said rubber and metal springs, rigid distributor plates of lesser thickness between rubber spring units of relatively different capacities, and relatively thin plates separating rubber spring units of like individual capacities.

4. In a shock-absorber, the combination comprising a plurality of rubber spring units of the character described and having like individual capacities, a plurality of rubber spring units of relatively different capacities, plates separating units of the first mentioned order, and relatively rigid distributor plates between contiguous units of relatively different capacities.

5. In a shock-absorber, the combination including a pair of movable followers spaced apart, a plurality of rubber spring units, and a pair of flat metal volute springs in series with said units and operatively engaging one of said followers, one of said followers constituting a casing for said last mentioned springs.

6. A shock-absorber comprising rubber spring units of the character described and of relatively different and like resistance values, metal plates separating units of like individual capacities, and relatively heavy distributor plates interposed mediate contiguous units having relatively different resistance values.

In witness whereof I have hereto set my hand this 7th day of December, 1929.

WILLIAM H. MUSSEY.